Nov. 20, 1923.

F. J. GEPPERT 1,475,063

DIRECTION SIGNAL

Filed March 7, 1922 2 Sheets-Sheet 1

Inventor
F. J. Geppert
Victor J. Evans
Atty

Nov. 20, 1923.   1,475,063
F. J. GEPPERT
DIRECTION SIGNAL
Filed March 7, 1922   2 Sheets-Sheet 2
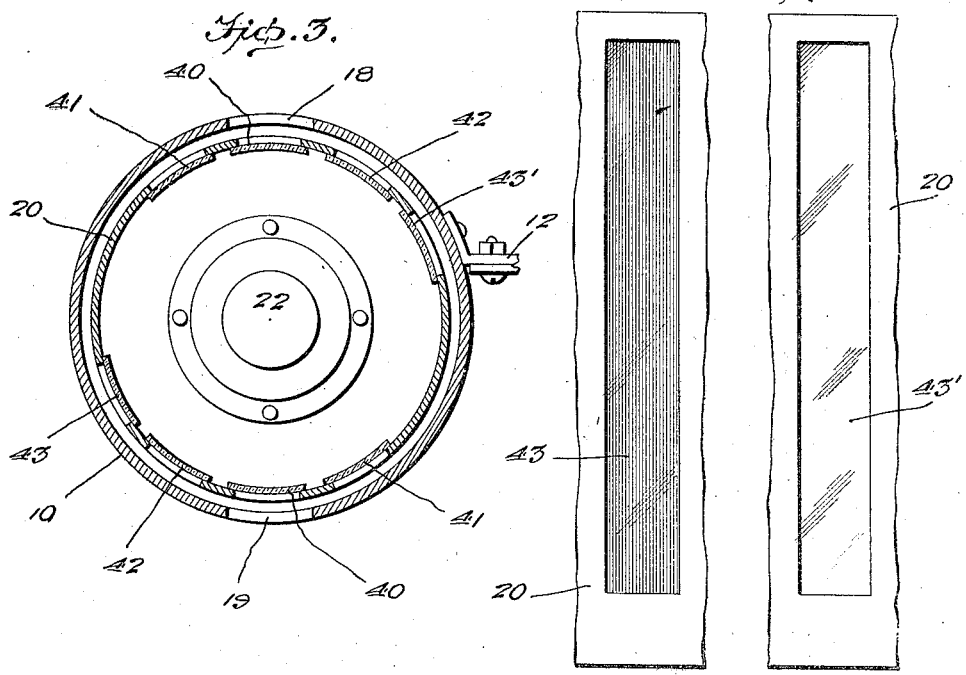
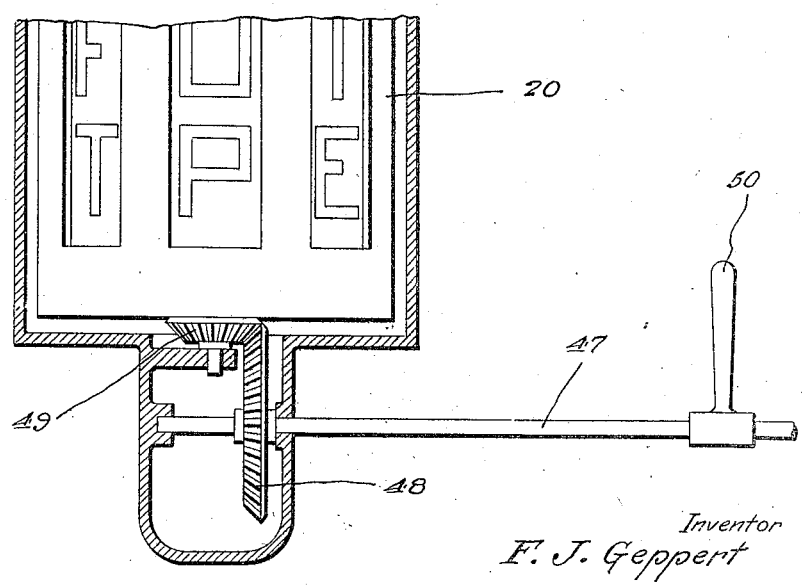
Inventor
F. J. Geppert
Victor J. Evans
Atty.

Patented Nov. 20, 1923.

1,475,063

UNITED STATES PATENT OFFICE.

FRANK J. GEPPERT, OF EAST ST. LOUIS, ILLINOIS.

DIRECTION SIGNAL.

Application filed March 7, 1922. Serial No. 541,874.

*To all whom it may concern:*

Be it known that I, FRANK J. GEPPERT, a citizen of the United States, residing at East St. Louis, in the county of St. Clair and State of Illinois, have invented new and useful Improvements in Direction Signals, of which the following is a specification.

This invention relates to a direction signal for motor cars and other vehicles, and one object is to provide a signal, or signals, which may be mounted on the wind shield, and which shall be visible from the front and rear, so that the warnings may be read by the driver of another car from any point from the roadway, in the immediate vicinity.

A further object is to provide illuminated rotatable signals, each carrying two groups of designations, or warnings, the respective groups being on opposite sides of the rotatable element, in each case with the individual signals of each group reversely arranged with reference to those of the adjacent group of the same rotatable element, and the rotatable elements of two signals, on opposite sides of a vehicle, moving in opposite directions with reference to the vehicle and in the same direction with reference to each other,—the signals being mounted as rights and lefts.

A still further object is to provide, in connection with the foregoing, a white light and a red light, one of these being in each group of signals, and so positioned with reference to the rotatable element that the white light is visible through an opening in the front of the casing at the time the red light is visible from or through an opening in the rear.

With the foregoing and other objects in view, the invention consists in the novel construction and arrangement of elements described and claimed, it being understood that modifications may be made within the scope of the claims, without departing from the spirit of invention.

Figure 1:
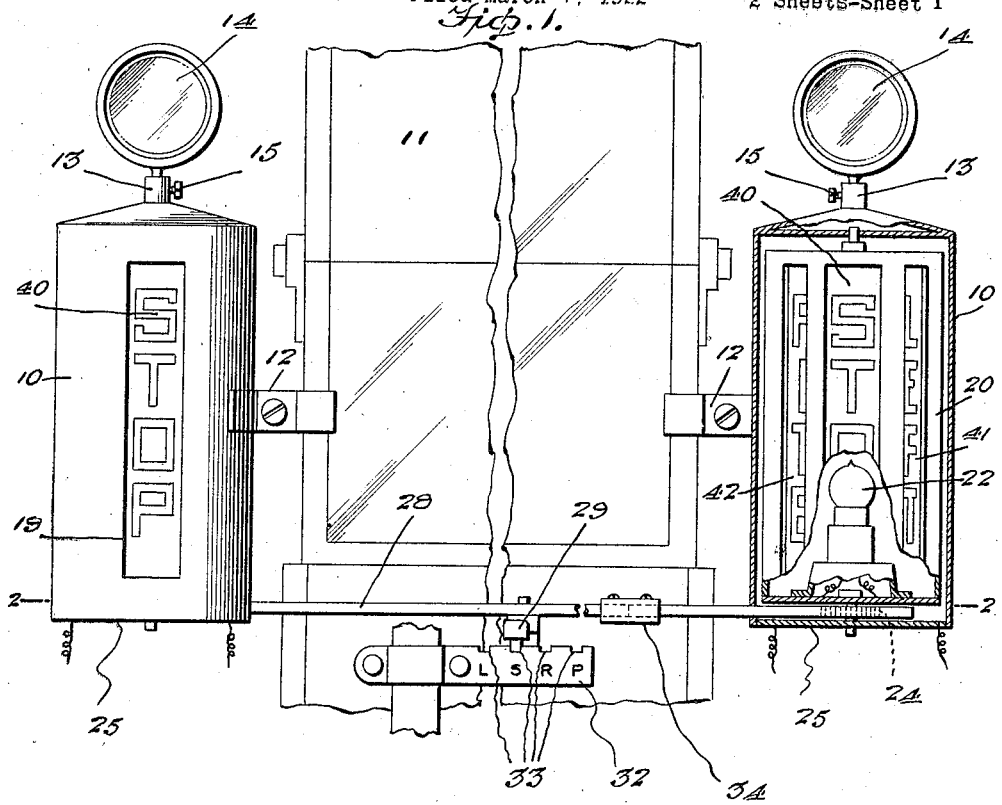
Figure 2:
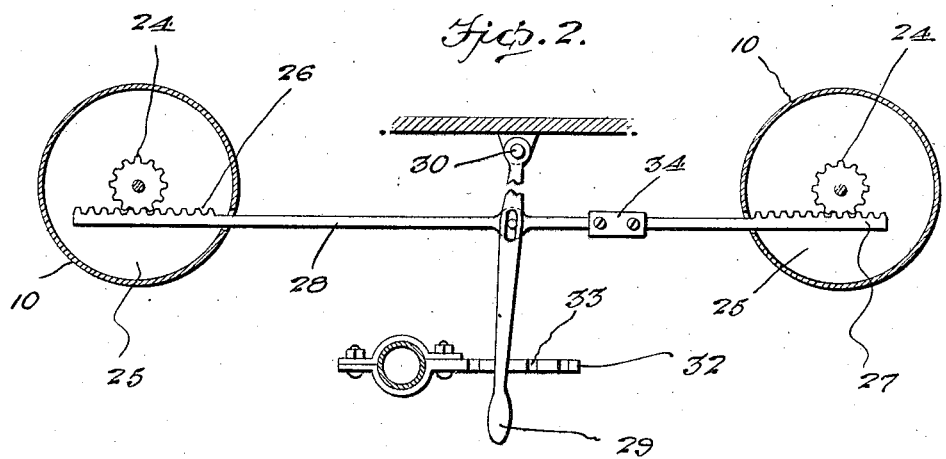

In the drawings, Figure 1 shows a plurality of signals and mounting means therefor, one of the casings being in rear elevation and the other in vertical section; Figure 2 shows rack and pinion mechanism for operating the signals, the view being in horizontal section (line 2—2 of Fig. 1) and top plan; Figure 3 is a horizontal section through one of the signals and its casing; Figure 4 shows a danger signal, and Figure 5 a strip, located in the signal element diametrically opposite the danger signal, but uncolored; Figure 6 is a view in vertical section showing a modification of the operating mechanism.

Each signal includes an outer casing 10, adapted to be mounted at the sides of the windshield 11, by means of clamping elements 12. The casings do not extend outwardly further than the running board. A socket member 13 is carried by the upper portion of each casing, and a mirror 14, or other device, may be secured in the socket, by means of set screws 15.

The casings are preferably of cylindrical form, being mounted in a vertical position, and each having a front opening and a rear opening, these openings being covered respectively, by plates of glass, designated 18 and 19.

The rotatable elements 20 are also of cylindrical form and carry the designations, or warnings in two groups. The rotatable element 20 is tubular, and is either of transparent material, or those portions carrying the warnings are of transparent material, a lamp 22 being mounted centrally of the element 20 for illuminating the warnings.

Rigidly mounted with reference to each rotatable member 20 is a pinion 24 which may be secured to the bottom elements 25. Movement is imparted to the pinions by means of racks 26 and 27, carried by rod 28 controlled by hand lever 29. This lever is pivoted at 30, the lever having pin and slot connection with rod 28. An arm 32 is clamped to the steering post, and is provided with notched portions 33 for engagement by the lever, the notches being spaced to correspond with the spacing of the warnings carried by element 20. The rod 28 may be in two sections connected by a coupling 34.

In the drawings, the designations or warnings 40 appear opposite to both the front and rear openings of the casings, or each casing. Corresponding warnings in the two groups on one signal are diametrically opposite each other and the warnings 41 are positioned as shown with reference to warnings 40. Other warnings 42 are on the opposite sides of the warnings 40. Each rotatable element 20 carries a vertically arranged strip 43, colored red, and diametrically opposite is a transparent strip 43', this arrangement permitting a white light to be thrown toward the front of the vehicle, at the time the red light appears at the rear, of the casing.

In the slightly modified form of actuating mechanism illustrated in Figure 6, I have shown a rotatable shaft 47 carrying a beveled gear wheel 48 meshing with a beveled pinion 49 rigid with reference to the rotatable element. This shaft 47 is rocked by means of a short lever 50.

Having thus described the invention, what is claimed is:

1. In a device of the class described, a casing having openings opposite each other, an element mounted to rotate in the casing and carrying warnings, said warnings being arranged in two groups, those of each group being visible through one of the openings in the casing, and means for imparting rotation to said elements within the casing, a second casing similarly constructed and a rotatable element therein, carrying warnings, and means for imparting rotation to the elements within the second casing, the signals of each group appearing in the opposite order of succession, from left to right, to those of the other group of the same rotatable element, and the rotatable elements of two signals, on opposite sides of a vehicle, moving in opposite directions with reference to the vehicle and in the same direction with reference to each other.

2. In a device of the class described, a casing having openings opposite each other, an element mounted to rotate in the casing and carrying warnings, said warnings being arranged in two groups, those of each group being visible through one of the openings in the casing, and means for imparting rotation to said elements within the casings, an illuminating device within the rotatable element, displaying corresponding warnings simultaneously by rotation in opposite directions, said element last named being tubular and including a transparent portion through which a white light is visible, when opposite an opening in the casing, and a tubular element including a colored portion for indicating danger, these transparent portions and colored portions respectively being simultaneously opposite the openings of the casing.

FRANK J. GEPPERT.